(12) United States Patent
Cho et al.

(10) Patent No.: US 6,750,809 B1
(45) Date of Patent: Jun. 15, 2004

(54) HIGH RESOLUTION SAR PROCESSING USING STEPPED FREQUENCY CHIRP WAVEFORM

(75) Inventors: Kwang M. Cho, Rancho Palos Verdes, CA (US); Leo H. Hui, Alhambra, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/414,322

(22) Filed: Apr. 15, 2003

(51) Int. Cl.$^7$ ................................. G01S 13/38
(52) U.S. Cl. .................. 342/129; 342/201; 342/204; 342/132
(58) Field of Search ................. 342/128, 129, 342/130, 195, 200, 201, 204, 25, 132

(56) References Cited

U.S. PATENT DOCUMENTS

| | | | | |
|---|---|---|---|---|
| 5,019,825 A | * | 5/1991 | McCorkle | 342/201 |
| 5,339,084 A | * | 8/1994 | Watanabe et al. | 342/129 |
| 5,428,361 A | * | 6/1995 | Hightower et al. | 342/201 |
| 5,731,784 A | * | 3/1998 | Barron et al. | 342/204 |

FOREIGN PATENT DOCUMENTS

WO    PCT/GB86/00347    * 12/1986    ........... G01S/13/42

* cited by examiner

Primary Examiner—Ian J. Lobo
(74) Attorney, Agent, or Firm—Leonard A. Alkov (57) ABSTRACT

A radar system has improved range resolution from linear frequency modulated (LFM) first sub-pulse and second sub-pulse, both having linear frequency modulation about different center frequencies. The first transmitted sub-pulse and the second transmitted sub-pulse have chirp slope $\gamma$. Sample shifting and phase adjusting is performed for the first radar returns with respect to second radar returns to form a line of frequency modulated chirp slope $\gamma$ with respect to time, the line connecting the center frequencies of the center frequencies.

The first sub-pulse and second-sub pulse can have equal time duration, where the first and second center frequency are equidistant from a reference frequency. The returns are reflected by a target located at a location near a reference point s. The radar computes the reference frequency $f_{ref}$ centered with respect to the first center frequency $f_1$ and the second center frequency $f_2$, $$f_{ref} = \frac{f_1 + f_2}{2};$$

a reference time $$t_{ref} = \frac{t_1 + t_2}{2};$$

a time delay $\tau_{s,m}$ to said reference point s with respect to time $t_m$ for m=1,2
a time delay $\tau_{s,ref}$ to said reference point s with respect to said reference time $t_M$, where

$$\tau_{s,ref} = \frac{\tau_{s,1} + \tau_{s,2}}{2}.$$

The first sub-pulse returns received from the first sub-pulse are shifted by an amount $$\Delta \tau_m = -\frac{(f_{ref} - f_m)}{\gamma} + \tau_{s,ref} - \tau_{s,m}.$$

Typically, the radar de-chirps returns prior to sample shifting and phase adjusting. In an example, the radar de-skews returns prior to sample shifting and phase adjusting. In another example, de-chirped returns are de-skewed after sample shifting and phase adjusting.

20 Claims, 8 Drawing Sheets

HIGH RESOLUTION SAR PROCESSING USING STEPPED FREQUENCY CHIRP WAVEFORM

This invention was made with Government support under Contract No. F19628-00-C-0100 awarded by the Department of the Air Force. The Government has certain rights in this invention.

BACKGROUND OF THE INVENTION

1. Field of Invention

This invention is in the field of radar signal processing and describes a method of combining information derived from a plurality of sub-pulses to increase apparent radar bandwidth.

2. Description of the Related Art

Synthetic Aperture Radar (SAR) radar is used for ground mapping as well as target identification. The general principle behind SAR is to coherently combine the amplitude and phase information of radar returns from a plurality of sequentially transmitted pulses from a relatively small antenna on a moving platform.

The plurality of returns generated by the transmitted pulses along a known path of the platform make up an array length. During the array length, amplitude as well as phase information returned from each of the pulses, for each of many range bins, is preserved. The SAR image is formed from the coherent combination of the amplitude and phase of return(s) within each range bin, motion compensated for spatial displacement of the moving platform during the acquisition of the returns for the duration of the array length.

The plurality of pulses transmitted during an SAR array length, when coherently combined and processed, result in image quality comparable to a longer antenna, corresponding approximately to the "length" traveled by the antenna during the array length.

Range target resolution in SAR images is determined by the radar bandwidth. Range resolution is inversely proportional to radar bandwidth. That is, the higher the bandwidth, the smaller the details of a radar scatterer can be discerned in a range bin. Therefore, ideally, radar imaging is best enhanced by short pulses of high peak power. However, because of various cost and engineering constraints, only relatively low peak power, longer transmitted pulses are generally available. To avoid this high peak power limitation, sometimes encoded, stretched pulses are used. One example of coding of longer transmitted pulses is linear phase modulation (LFM)—also known as a chirp. LFM coding is used to transmit sub-pulses that have varying center frequencies with limited bandwidths and combine the returns for each sub-pulse thereby increasing the effective bandwidth for imaging. This technique of combining the bandwidth of the radar by combining multiple stepped frequency pulses is the step stretch or stepped frequency method.

In the prior art, step stretch methods have combined "chirped" pulses in typical de-chirp processing. However, the full potential of combining returns of chirped sub-pulses has not been reached. Thus, the present invention details combining signals for post de-chirp processing and A/D conversion.

SUMMARY OF THE INVENTION

By combining reflected radar returns from two or more sub-pulses, a radar system has improved range resolution. In the case of two sub-pulses, linear frequency modulated first radar returns reflected from a transmitted first sub-pulse and second radar returns reflected from a transmitted second sub-pulse form an image generated from said returns. Said first transmitted sub-pulse has linear frequency modulation centered about a first center frequency, $f_1$, and is transmitted at time $t_1$. Said second transmitted sub-pulse having linear frequency modulation is centered about a second center frequency, f2, and transmitted at time $t_2$. The second center frequency is typically higher than said first center frequency. The first transmitted sub-pulse and the second transmitted sub-pulse have a linear frequency modulated chirp slope γ. The radar comprises means for sample shifting and phase adjusting said first radar returns reflected from said transmitted first sub-pulse with respect to said second radar returns reflected from said second pulse to form a line of frequency modulated chirp slope γ with respect to time, said line connecting said first center frequency with said second center frequency.

Said first sub pulse and second sub pulse typically have equal time duration, where the first and the second center frequency are equidistant from a reference frequency. The returns are reflected by a target located at a location near a reference point s. The radar has means for computing said reference frequency $f_{ref}$ centered with respect to said first center frequency and said second center frequency, $$f_{ref} = \frac{f_1 + f_2}{2};$$

a reference time $$t_{ref} = \frac{t_1 + t_2}{2};$$

a time delay $\tau_{s,m}$ to said reference point s with respect to time $t_m$ for m=1,2;
a time delay $\tau_{s,ref}$ to said reference point s with respect to said reference time $t_{ref}$ where $$\tau_{s,ref} = \frac{\tau_{s,1} + \tau_{s,2}}{2};$$

Also provided is means for time shifting said first sub pulse returns received from said first sub-pulse by an amount $$\Delta \tau_m = -\frac{(f_{ref} - f_m)}{\gamma} + \tau_{s,ref} - \tau_{s,m}$$

thereby time shifting and phase adjusting said return information obtained from said first sub-pulse with information obtained from said second sub-pulse to increase the apparent receiving bandwidth of said radar. The second sub-pulse is similarly shifted.

The radar uses the first sub-pulse having linear frequency modulation extending from a minimum frequency of $f_{1,min}$ to a maximum frequency $f_{1,max}$. The second sub-pulse has linear frequency modulation extending from a minimum frequency of $f_{2,min}$ to a maximum frequency $f_{2,max}$, $f_{1,max}$ and $f_{2,min}$ can be equal, but typically overlap. Data generated within this overlap is either deleted so as not to contribute to the resulting radar image of the target, or is merged or concatenated for magnitude and phase continuation. The result is a pulse return that effectively equals in bandwidth that formed with a single pulse transmission that has the sum of the non-overlapping sub-pulse bandwidths, thus improving image resolution.

As an example, consider a radar that has a target resolution $\delta$, number of steps to form a full pulse (number of sub-pulses) $M_{step}$, main lobe broadening factor k, frequency overlap (normalized by the sub-pulse bandwidth) $O_v$, and speed of light C. Then, the radar full bandwidth is $$BW = \frac{kC}{2\delta},$$

the sub-pulse step bandwidth $BW_1$ is $$BW_1 = \frac{BW}{M_{step}(1 - O_v) + O_v},$$

and a center frequency $f_{c1}(m)$ at step m for m=1, 2 ... $M_{step}$ is computed from $$f_{c1}(m) = f_c - \frac{BW}{2} + BW_1[(m-1)(1 - O_v) + 1/2].$$

Typically, the radar de-chirps first radar returns reflected from said transmitted first sub-pulse and second radar returns reflected from said transmitted second sub-pulse, and so on, prior to sample shifting and phase adjusting.

In one example, the radar de-skews first radar returns reflected from said transmitted first sub-pulse and second radar returns reflected from said transmitted second sub-pulse, and so on, prior to said sample shifting and phase adjusting.

In another example, the radar de-skews the first radar returns reflected from said transmitted first sub-pulse and second radar returns reflected from said transmitted second sub-pulse, and so on, after said sample shifting and phase adjusting.

DETAILED DESCRIPTION

The present invention describes a method of digital processing of radar returns having chirped frequency modulation where the returns from two or more sub-pulses chirped around different frequencies are combined to increase the apparent bandwidth of the radar. The combination of returns from said two or more sub-pulses improves the range resolution of the resulting radar image in a manner similar to improving radar bandwidth.

Figure 1:
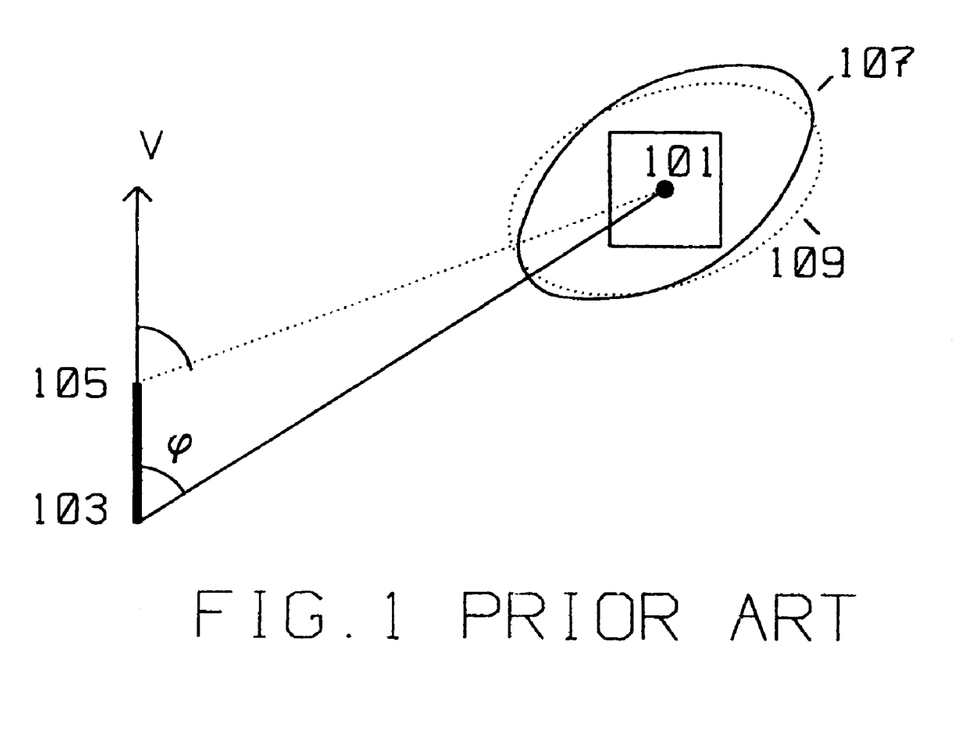
FIG. 1 is an exemplary configuration of a SAR radar acquiring data to be used with the present invention.

FIG. 1 shows the typical geometric relationship between a moving platform carrying a radar transmitter/receiver using Synthetic Aperture (SAR) methods and target area 101 to be imaged by said radar transmitter/receiver. The moving platform is initially at position 103, travels with velocity V in the direction shown. The antenna is pointing at an angle φ with respect to velocity V. The moving platform moves from position 103 to position 105, while adjusting angle φ for spotlight mode so that the antenna keeps illuminating target area 101. Antenna illumination with radar energy during the collection period of reflected radar signals is large enough o cover the target area 101. The illuminated area is slightly rotated between platform positions 103 and 105 as indicated by antenna illumination foot print on the ground 107 and 109. Radar pulses are transmitted and received at many points on flight track between position 103 and position 105. SAR radar is well known in the art and described by W. Carrara, et al, in *Spotlight Synthetic Aperture Radar*, Artech house, 1995, incorporated herein be reference in its entirety.

Figure 2:
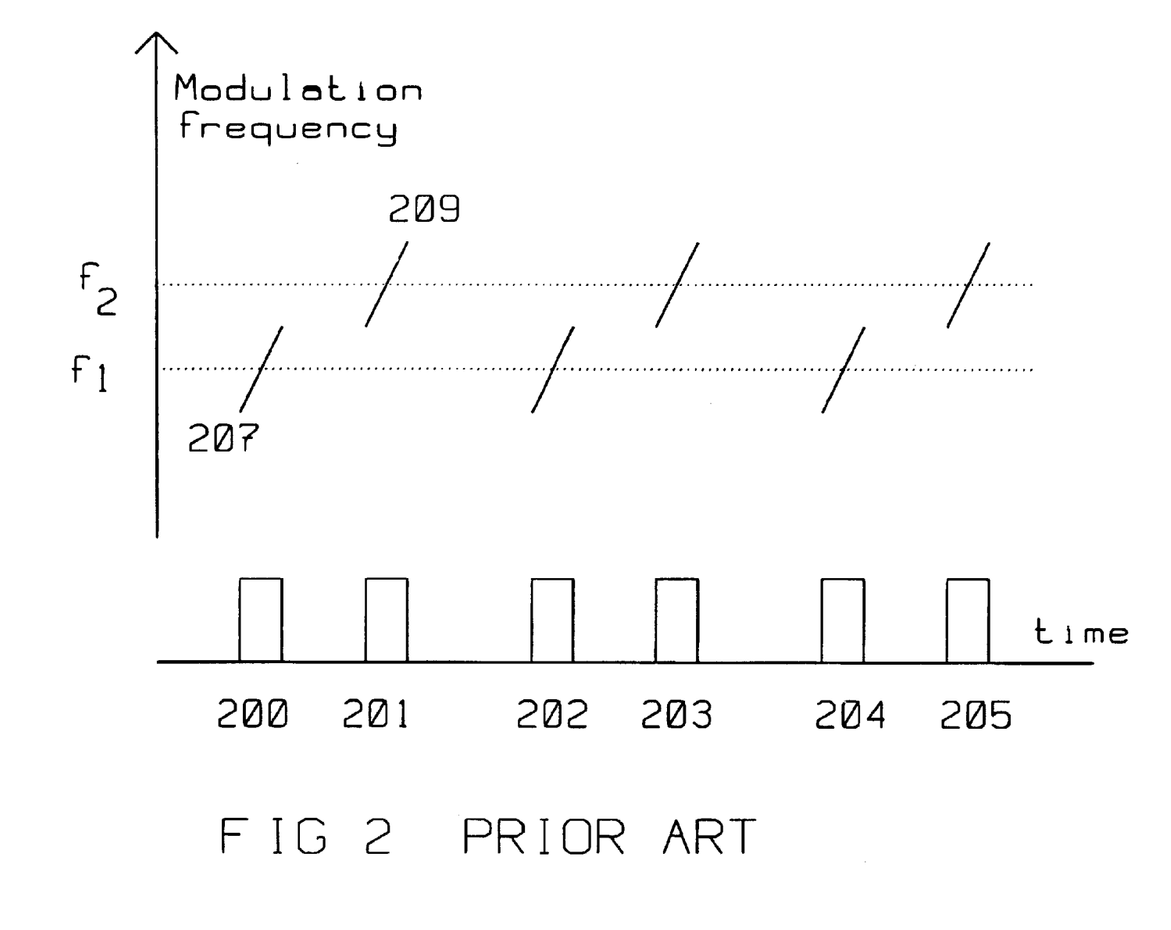
FIG. 2 is an exemplary transmission from a radar of the prior art having sub-pulse groups, each comprised of two sub-pulses having stepped center frequencies.

FIG. 2 shows three pairs of two sub-pulses, 200 and 201, 202 and 203, 204 and 205 of the prior art, having linear frequency modulation (LFM) (chirp) around two frequency bands $f_1$ and $f_2$ for bandwidth improvement. Such pulses are typically used in a SAR radar of FIG. 1. Sub-pulse 200 and 201 are exemplary of forming two frequency steps. Sub-pulse 200 has LFM (chirp) around frequency $f_1$, while sub-pulse 201 has LFM around frequency $f_2$. Sub-pulse 200 is initially modulated with a frequency less than $f_1$, as indicated by the frequency band 207. The linear modulation frequency of sub-pulse 200 increases over the time duration of sub-pulse 200 to a frequency higher than $f_1$. Similarly, sub-pulse 201 is initially LF modulated starting at a frequency less than $f_2$, increased over the duration of sub-pulse 201 to a frequency higher than $f_2$, as shown by the frequency band 209. Sub-pulses 202 and 204 have LFM around $f_1$, while sub-pulses 203 and 205 have LFM around $f_2$.

This invention addresses a method for combining information contained in radar returns from a pair of sub-pulses, for example 200 and 201. The mathematical derivation of the method is provided below for clarity and universality. The following variables will be used:

γ—LFM (or chirp) slope, typically positive, indicating lower frequency at the start of a sub-pulse, changing to a higher frequency during the duration of a transmitted sub-pulse.

$f_m$—center frequency of step m.

n—sub-pulse group index, n=1, 2, ... N.

N—number of sub-pulse groups.

m—step index within each sub pulse group, m=1, 2, ... $M_{step}$.

$M_{step}$—number of sub-pulses.

M—reference step index, M=($M_{step}$+1)/2.

t—time.

$t_{n,m}$—transmit time for sub-pulse m in group n.

$\tau_{t,m}$—time delay to a target at step m.

$\tau_{s,m}$ time delay to a reference point at step m.

$\Phi^T$ phase of transmitted signal.

$\Phi^R$ phase of received signal.

$\Phi^{REF}$ phase of reference signal for LFM.

FIG. 2 shows pairs of typical transmitted pulses (200, 201), (202, 203), and (204, 205) of the prior art allocated to two frequency steps for bandwidth improvement. Pulse 200 and 201 are exemplary of forming two frequency steps for a single pulse. Pulse 200 is chirped around frequency $f_1$, while pulse 201 is chirped around frequency $f_2$. Pulse 200 and 201 form a sub-pulse pair.

FIG. 2, and a de-chirped signal mathematical expression above, details the method for combining sub-pulse returns in accordance with this invention.

Phase of LFM Transmitted pulses:

$$\Phi_m^T(t, n) = f_m t + \frac{\gamma}{2}(t - t_{n,m})^2$$

Phase of LFM Received pulses from radar scatterer:

$$\Phi_m^R(t, n) = f_m(t - \tau_{t,m}) + \frac{\gamma}{2}(t - t_{n,m} - \tau_{t,m})^2 \quad (1)$$

Phase of LFM Reference:

$$\Phi_m^{REF}(t, n) = f_m t + \frac{\gamma}{2}(t - t_{n,m} - \tau_{s,m})^2$$

Substituting a simplifying expression with a new time variable, $\hat{t}$:

$$\hat{t} = t - t_{n,m}$$

The phase expression for the de-chirp processing becomes:

$$\Phi_m(t, n) = -\Phi_m^R + \Phi_m^{REF} = \quad (2)$$
$$f_m \tau_{s,m} + [f_m + \gamma(\hat{t} - \tau_{s,m})](\tau_{t,m} - \tau_{s,m}) - \frac{\gamma}{2}(\tau_{t,m} - \tau_{s,m})^2$$

Considering a sub-pulse group, where the pulses have index m and m−i, it is generally true that $\tau_{s,m} \approx \tau_{s,m-i}$ and $\tau_{t,m} \approx \tau_{t,m-i}$ However, the difference between the time delay to a target and the time delay to the reference point stays about the same for two sub-pulses.

$$(\tau_{t,m-i} - \tau_{s,m-i}) \approx (\tau_{t,m} - \tau_{s,m})$$

Using this approximation of the time delay difference between sub-pulses within the same sub-pulse group, equation 2 can be further simplified for reference step M and any sub-pulse step m within the same sub-pulse group. Using the substitution $\Delta\tau_t = \tau_{t,m} - \tau_{s,m}$, we obtain:

$$\Phi_M(t) = f_M \tau_{s,M} + [f_M + \gamma(\hat{t} - \tau_{s,M})]\Delta\tau_t - \frac{\gamma}{2}\Delta\tau_t^2$$

$$\Phi_m(t) = f_m \tau_{s,m} + [f_m + \gamma(\hat{t} - \tau_{s,M})]\Delta\tau_t - \frac{\gamma}{2}\Delta\tau_t^2$$

From the above, to get a composite signal without discontinuity from sub-pulse returns, it is required to maintain phase coherence. This means that the phase calculated for $\Phi_M$ and $\Phi_m$ above should be equal between step M and m for all values of time variable t.

Comparing phase terms that are independent of targets, the required phase correction to the signal at step m is $$\Delta\Phi_m = f_M \tau_{s,M} - f_m \tau_{s,m} \quad (3)$$

To obtain the time delay adjustment at step m, introduce the a time shifting variable $\Delta\tau_m$ and set the multiplying terms to $\Delta\tau_t$ in two expressions to be equal:

$$f_m + \gamma(\hat{t} - \tau_{s,M}) = f_m + \gamma(\hat{t} - \tau_m - \tau_{s,m})$$

$\Delta\tau_m$ is now computed from:

$$\Delta\tau_m = \tau_{s,M} - \tau_{s,m} - (f_M - f_m)/\gamma \quad (4)$$

Using above expression, the phase record of the received return at step m can be adjusted for phase coherence to the reference phase record at step M through time shifting and phase adjusting in accordance with $$\Phi_m(\hat{t}) = \Phi_m(\hat{t} - \Delta\tau_m) + \Delta\Phi_m \quad (5)$$

Figure 3:
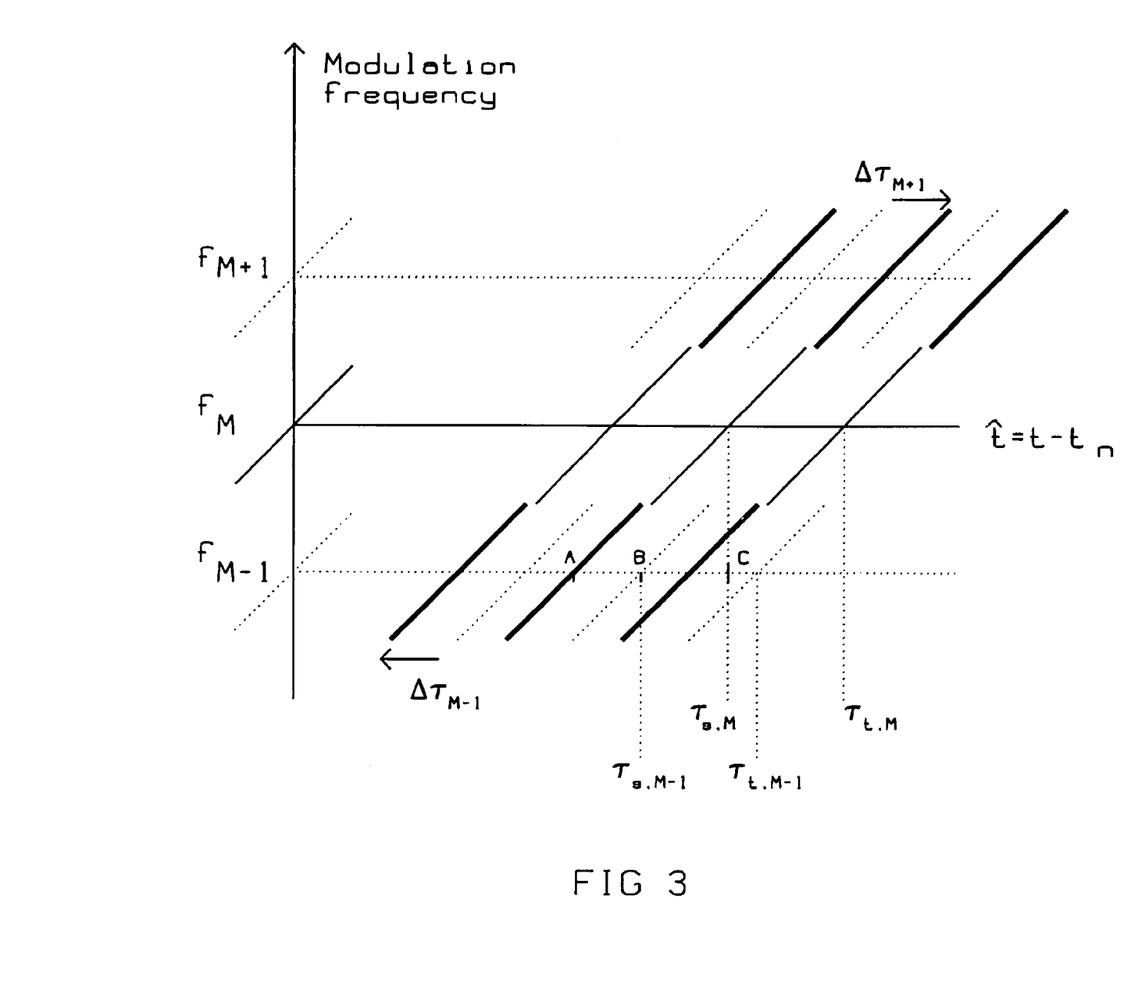
FIG. 3 is an exemplary combination of radar returns aligned for higher bandwidth in accordance with the present invention.

Above derived time shifting for maintaining phase continuity at step m can be validated by observing the relationship between neighboring steps shown in FIG. 3. FIG. 3 shows the frequencies corresponding to $\Phi_m^R(t,n)$ in equation 1.

Using equation 5, combined with equation (3) and (4), the phase record at step m can be adjusted for phase coherence to the reference phase record at step M through time shifting and phase adjusting.

Equation 5 can also be visually interpreted by observing adjacent frequency steps as illustrated in FIG. 3. FIG. 3 uses the same frequency/time depiction as FIG. 2. FIG. 3 shows the frequencies of LFM transmitted signals at three steps and their respective returns. Two groups of dotted lines indicate returned (reflected) signals at two sub-pulses around the central one. The central one is the the reference step. Adjustments to maintain phase continuity in accordance with equation 5 are made so that linear frequency profiles from all steps are connected. Visually, in FIG. 3, the required adjustments at step M−1 is to align it to step M. Consider the three points A,B,C shown. A and B, respectively, are the time delays to the reference point before and after adjustments at step M−1. C is the time delay to the reference point at step M, $\tau_{s,M}$. The time delay for point B is $\tau_{s,M-1}$. Graphically, in FIG. 3 the required time shift is $\overline{BA}$, and can be determined by:

$$\Delta\tau_{M-1} = \overline{BA} = \overline{CA} - \overline{CB} = -\frac{(f_m - f_{M-1})}{\gamma} + \tau_{s,M} - \tau_{s,M-1}$$

This expression is identical to equation 4 for m M−1.

Bandwidth Considerations

Denote the band overlap normalized by a single step bandwidth as $O_v$. The required full bandwidth BW and single step bandwidth $BW_1$ can be calculated for a desired resolution $\delta$, number of steps $M_{step}$, main lobe broadening factor k, overlap $O_v$ and speed of light C.

$$BW = \frac{kC}{2\delta}$$

$$BW_1 = \frac{BW}{M_{step}(1 - O_v) + O_v} \quad (6)$$

Center frequency at step m for the center frequency of the composite waveform, $f_c$, for m=1, 2 ... $M_{step}$, is calculated using $$f_m = f_c - \frac{BW}{2} + BW_1[(m-1)(1-O_v) + 1/2] \quad (7)$$

Combining Data From Sub-pulses

Figure 4:
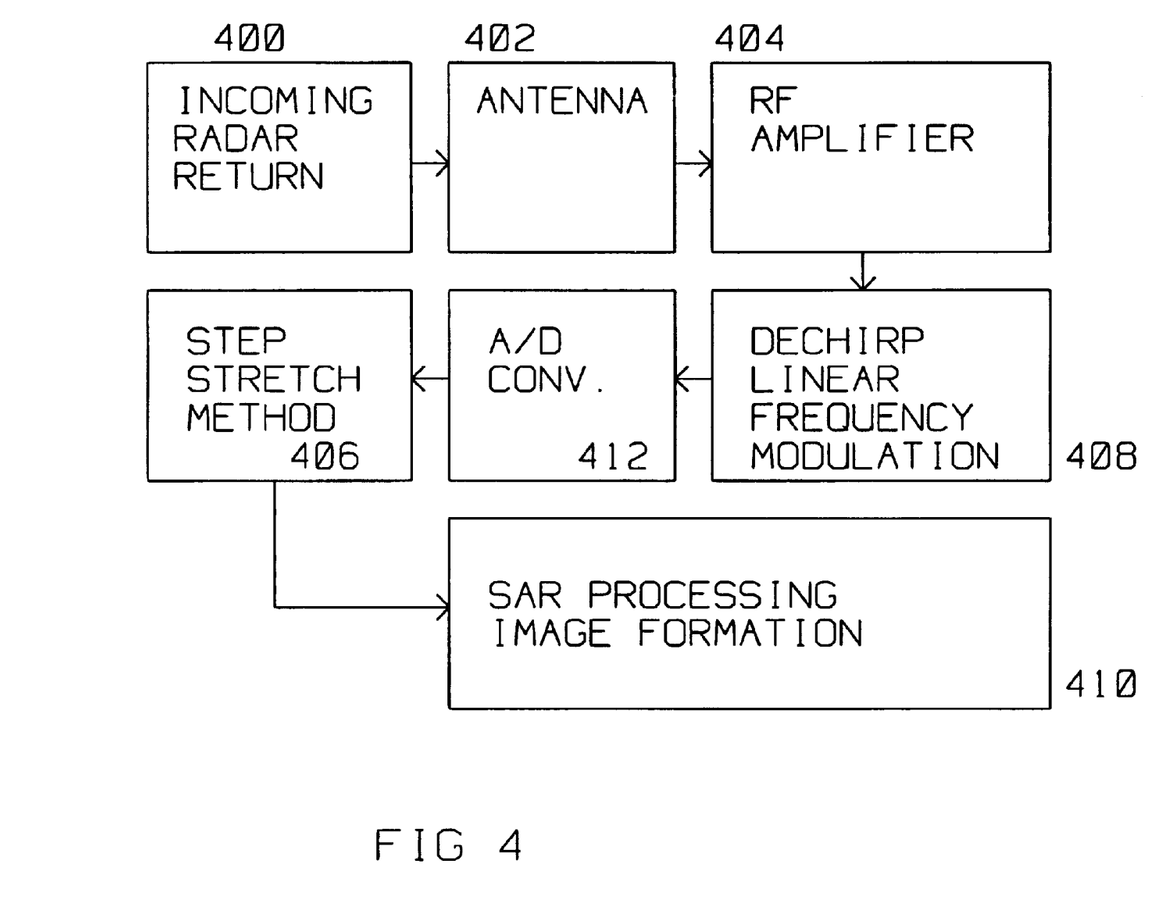
FIG. 4 is a typical radar system utilizing the Step Stretch method of the present invention within the receiver portion.

FIG. 4 shows the typical radar configuration where the step stretch method detailed in equation 5 above for incoming linear frequency modulated returns is used. As shown in FIG. 4, LFM radar return 400 is received by antenna 402. The signal collected by antenna 402 is amplified, in block 404. The resulting linear frequency modulated signal is de-chirped in block 408, that is, it is passed through a matched filter for LFM, as described by Eli Brookner in Chapter 8 of *Radar Technology*, Artech House, 1985, ISBN number 0-89006021-5, incorporated herein be reference in its entirety.

After downshifting in frequency, the de-chirped analog signals are converted to digital format in analog to digital converter 412. The resulting digital signals are time shifted and phase adjusted to be combined in accordance with equation 3 in Step Stretch method 406. These resulting signals are further processed in SAR processing 410 to yield, for example, a SAR image of the radar signal reflectors contained within the radar returns.

Method A

Figure 5:
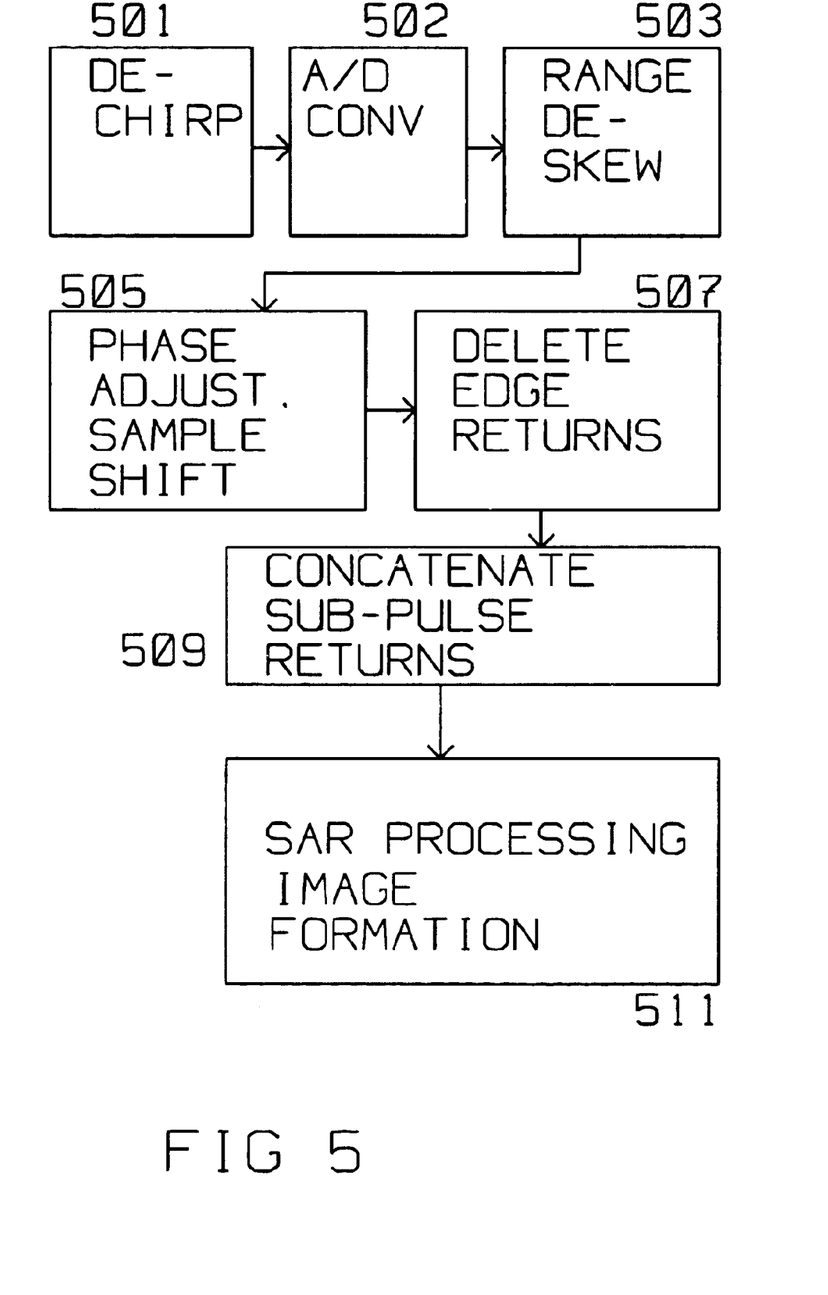
FIGS. 5 and 5A is an exemplary return data combining sequence utilizing the present invention where range de-skewing is performed before applying the methods of this invention.
Figure 5A:
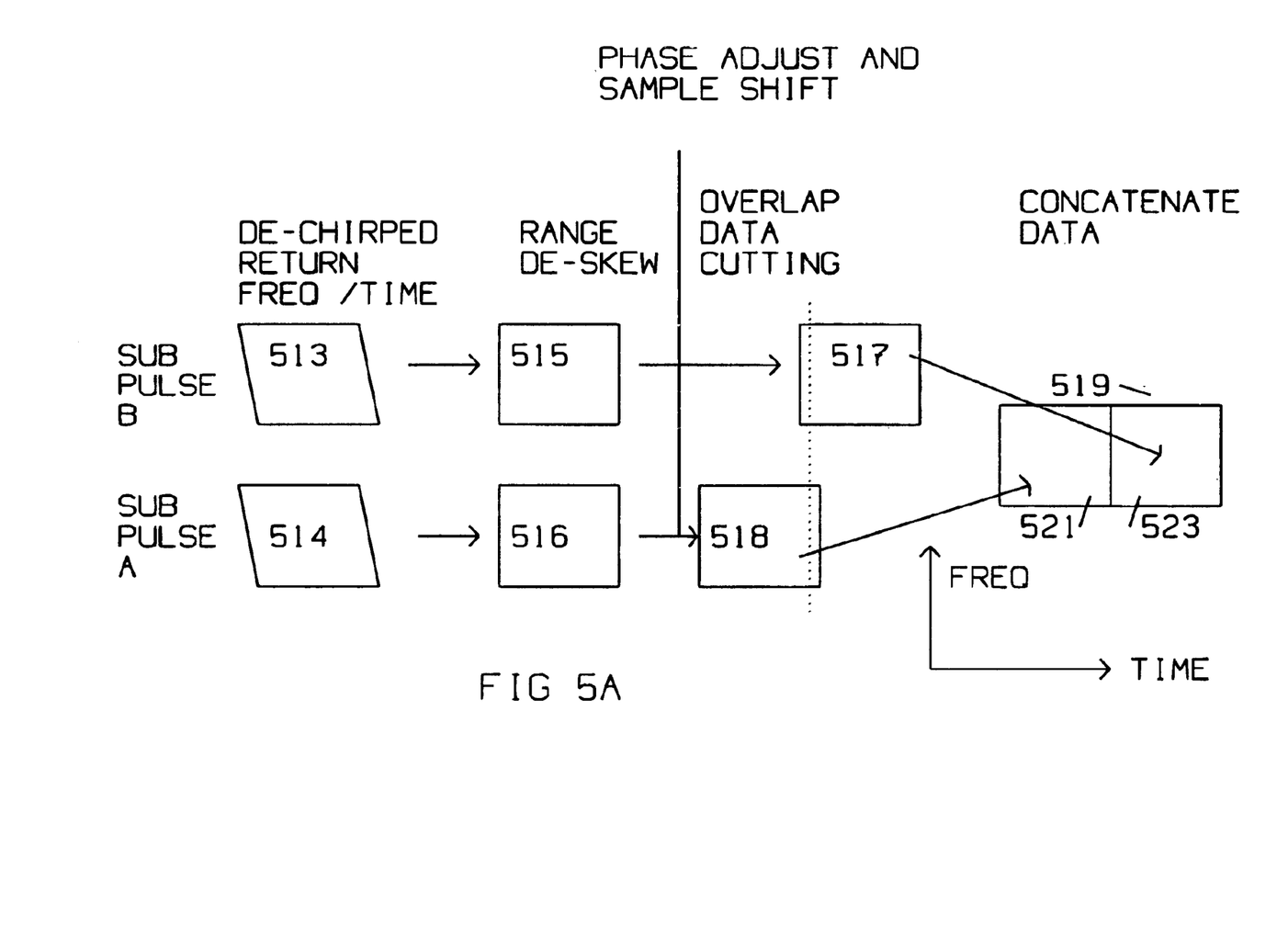

There are two methods envisioned to combine return from sub-pulses for enhanced imaging. The first one is shown in FIG. 5 and FIG. 5A, for the two sub-pulse case. In FIG. 5 de-chirped (target) returns 501 are converted to digital format by A/D converter 502. The digital samples are range de-skewed in block 503, then phase adjusted and sample shifted in block 505 in accordance with equation 5. Range de-skew is a method wherein radar returns at different Doppler frequencies arriving at different times are time aligned such that all time samples have data containing the full transmit bandwidth. Edge returns are deleted in 507, then the resulting sub-pulse data are concatenated in 509. The results from 509 are processed in SAR processing 511 to yield the SAR image.

Note that the first sub-pulse was transmitted with a linear frequency modulation extending from a minimum frequency of $f_{1,min}$ to a maximum frequency $f_{1,max}$. The second sub-pulse has linear frequency modulation extending from a minimum frequency of $f_{2,min}$ to a maximum frequency $f_{2,max}$. There is some overlap between $f_{1,max}$ and $f_{2,min}$. The advantage of the method of FIG. 5 is its minimal spectrum overlap since range samples returned from all pulses are aligned after range de-skew function. Reduced spectrum overlap means reduced range ambiguity. However, there are increased ripples around the sub-pulse boundaries, e.g at the overlap between $f_{1,max}$ and $f_{2,min}$. Cutting some data out in the overlapped portion between $f_{1,max}$ and $f_{2,min}$ will reduce the undesirable ripple effects. In the alternative, ripples can also be compensated for, to a certain level, by subtracting the predicted (theoretical) ripple output from the actual received signal. Sometimes, discrepancy between the real and actual signal shapes can result in ripples of unacceptable level. Therefore, the preferred method is to discard those returns with overlap as small as possible, in the vicinity of $f_{1,max}$ and $f_{2,min}$, as indicated in delete edge returns block 507, then concatenate the remaining returns for presentation to SAR processing image formation 511.

The steps taken in FIG. 5 are further detailed in FIG. 5A where sub-pulse B is de-chirped to yield a first range samples represented by de-chirped frequency/time map 513. Map 513 is range de-skewed to form the de-skewed data 515. The same procedure is used for sub-pulse A, where the radar returns from sub-pulse A are de-chirped for range samples represented by frequency/time data 514. Data 514 is de-skewed to become de-skewed data 516. De-skewed data 515 is subjected to data cutting, that is, eliminating data beyond the midpoint in the overlapped region, generating data 517. Similarly, data 516 is subjected to data cutting generating data 518. High resolution image is obtained by processing the composite range samples from data 519, that is range samples are obtained by concatenating data 517 and placed in partial half 523 with data 518 placed in partial half 521.

Method B

Figure 6:
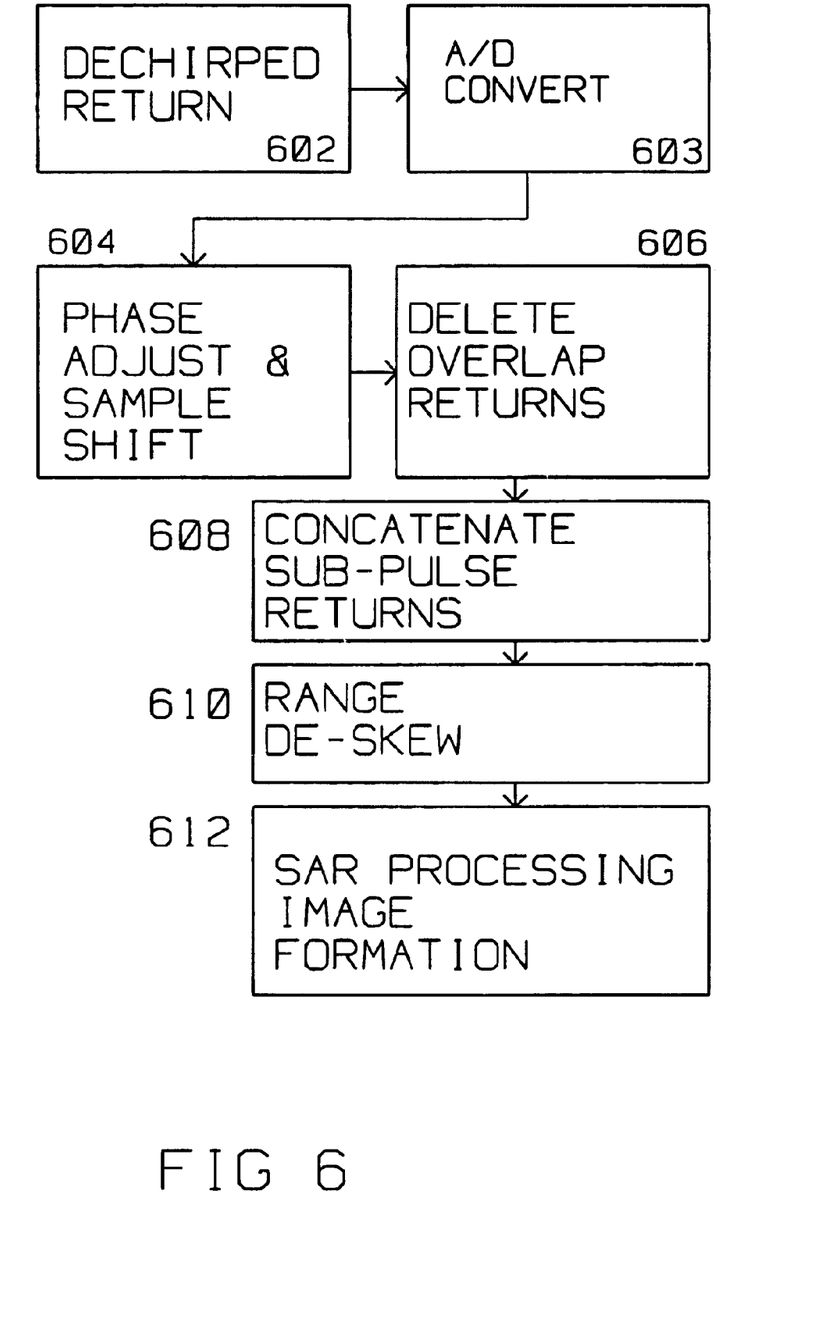
FIGS. 6 and 6A is an exemplary return data combining sequence utilizing the present invention where range de-skewing is applied after applying methods of this invention.

The second, alternative method envisioned to combine returns from two sub-pulses is shown in FIG. 6. Here, de-chirped returns 602 from the sub-pulses are converted to digital format in A/D converter 603. The digital samples are phase adjusted and sample shifted in block 604. There is overlap between $f_{1,max}$ and $f_{2,min}$. This overlap is deleted in delete overlap 606. Remaining returns are concatenated in concatenate sub-pulse returns 608. Range de-skew 610 de-skews the resulting frequency/time results. With this method, there are no large ripples around $f_{1,max}$ and $f_{2,min}$ since range de-skew is performed after the sub-pulse returns are combined. After range de-skew, the digital samples are processed in SAR processing 612 to generate the image contained in the de-chirped returns.

To maximize PRF, while avoiding Doppler ambiguity, $f_{1,max}$ and $f_{2,min}$ overlap. In this method of operation, since time delay corresponding to swath width is generally small compared with the radar bandwidth, the minimum overlap between sub-pulses is determined by swath width. In mathematical terms, for swath width SW and pulse width $T_p$, minimum overlap normalized with respect to pulse width is:

$$O2_v = \frac{2 \cdot SW}{C \cdot T_p}$$

Overlap bandwidth is then computed by:

$$BW_{overlap} = \frac{2 \cdot SW}{C \cdot T_p} \cdot BW_1 \quad (B)$$

where $BW_1$ is the bandwidth of single step detailed in equation 6.

Figure 6A:
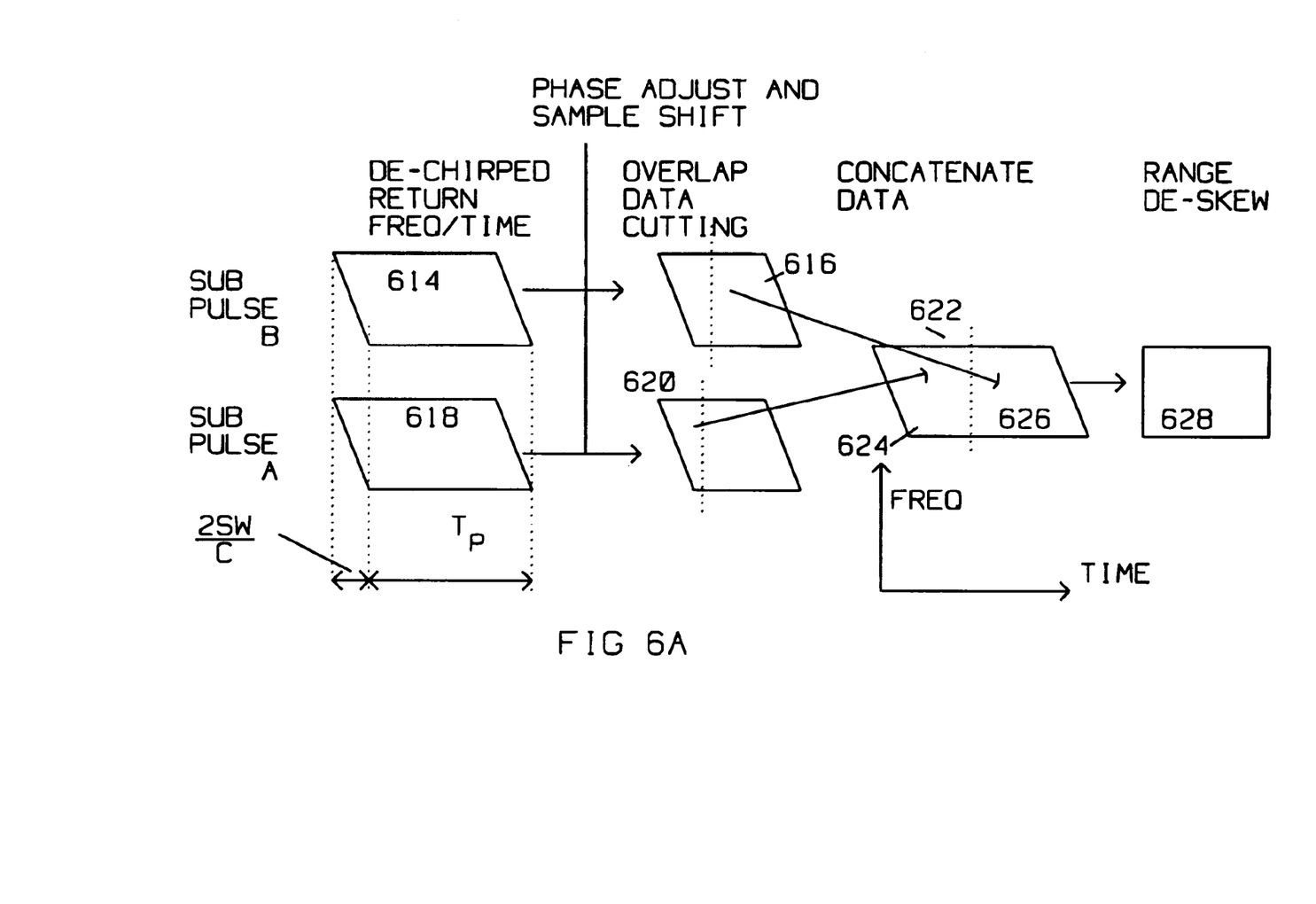

FIG. 6A further details this method. Returns from sub-pulse A are de-chirped and A/D converted to create range samples that are represented by frequency/time map 618. Similarly, returns from sub-pulse B are de-chirped to create frequency/time map 614. Map 618 is phase adjusted and time shifted to yield another map 616. Similarly, Map 614 is phase adjusted and time shifted in accordance with eq 3 to yield another map 616. Overlap data is cut from map 616 and map 620 as detailed in equation B above. What remains of map 620 after data cutting becomes partial map 624. Similarly, remaining portion of map 616 becomes partial map 626. The concatenation of maps 624 and 626 generate composite map 622. Composite range samples represented by map 622 is then range de-skewed in preparation for subsequent SAR processing.

Above is a method (and related apparatus) for improving range resolution of a radar receiving linear frequency modulated first radar returns reflected from a transmitted first sub-pulse and second radar returns reflected from a transmitted second sub-pulse, for forming an image generated from said returns.

The first transmitted sub-pulse has linear frequency modulation centered about a first center frequency, $f_1$, and is transmitted at time $t_1$.

The second transmitted sub-pulse has linear frequency modulation centered about a second center frequency, $f_2$, and is transmitted at time $t_2$.

The second center frequency is higher than the first center frequency.

The first transmitted sub-pulse and the second transmitted sub-pulse have a linear frequency modulated chirp slope a, said method comprising the step of sample shifting and phase adjusting said first radar returns reflected from said transmitted first sub-pulse with respect to said second radar returns reflected from said second pulse to form a line of frequency modulated chirp slope γ with respect to time, said line connecting said first center frequency with said second center frequency.

For the case of two sub-pulses, the method for improving range resolution from returns reflected by a target located at a location near a reference point s, further comprises the steps of:

computing said reference frequency $f_{ref}$ centered with respect to said first center frequency and said second center frequency, $$f_{ref} = \frac{f_1 + f_2}{2};$$

computing a reference time $$t_{ref} = \frac{t_1 + t_2}{2};$$

computing a time delay $\tau_{s,m}$ to said reference point s with respect to time $t_m$, for m=1, 2;

computing a time delay $\tau_{s,ref}$ to said reference point s with respect to said reference time $t_{ref}$;

time shifting said first sub-pulse returns received from said first sub-pulse by an amount $$\Delta\tau_m = -\frac{(f_{ref} - f_m)}{\gamma} + \tau_{s,ref} - \tau_{s,m}$$

thereby time shifting and phase aligning said return information obtained from said first sub-pulse with information obtained from said second sub-pulse to increase the apparent receiving bandwidth of said radar.

The linear frequency modulation has generally a positive slope.

The first sub-pulse has linear frequency modulation extending from a minimum frequency of $f_{1,min}$ to a maximum frequency $f_{1,max}$ and said second sub-pulse has linear frequency modulation extending from a minimum frequency of $f_{2,min}$ to a maximum frequency $f_{2,max}$, $f_{1,max}$ and $f_{2,min}$ overlap and data generated during this overlap is merged or concatenated for magnitude and phase continuity.

Consider a radar having a target resolution δ, number of steps $N_{step}$, main lobe broadening factor k, overlap $O_v$, and pulses traveling at the speed of light C. The radar full bandwidth is $$BW = \frac{kC}{2\delta},$$

and the the sub-pulse bandwidth $BW_1$ is $$BW_1 = \frac{BW}{M_{step}(1 - O_v) + O_v},$$

and the center frequency $f_m$ at step m for m=1, 2 ... $M_{step}$ is computed from $$f_m = f_c - \frac{BW}{2} + BW_1[(m - 1)(1 - O_v) + 1/2]$$

The method for improving range resolution can be performed a number of ways. Typically, first radar returns reflected from said transmitted first sub-pulse and second radar returns reflected from said transmitted second sub-pulse, are de-chirped prior to said step of sample shifting and phase adjusting in accordance with equation 5.

One option is for the first radar returns reflected from said transmitted first sub-pulse and second radar returns reflected from said transmitted second sub-pulse, to be de-skewed prior to said step of sample shifting and phase adjusting in accordance with equation 5.

Another choice is for said first radar returns reflected from said transmitted first sub-pulse and second radar returns reflected from said transmitted second sub-pulse, to be de-skewed after said step of sample shifting and phase adjusting in accordance with equation 5.

The method for improving range resolution calls for said first radar returns reflected from said transmitted first sub-pulse and second radar returns reflected from said transmitted second sub-pulse, each having a pulse width $T_p$ covering a swath width SW, traveling at speed of light C. Now, the overlap frequency $O2_v$ of said first radar return and said second radar return is computed from:

$$O2_v = \frac{2 \cdot SW}{C \cdot T_p}.$$

All references cited in this document are incorporated herein in their entirety by reference.

Although presented in exemplary fashion employing specific embodiments, the disclosed structures are not intended to be so limited. For example, while a two step sub-pulse is discussed, the concept can be extended to any number of sub-pulses.

Those skilled in the art will also appreciate that numerous changes and modifications could be made to the embodiment described herein without departing in any way from the invention. These changes and modifications and all obvious variations of the disclosed embodiment are intended to be embraced by the claims to the limits set by law.

We claim:

1. A method for improving range resolution of a radar receiving linear frequency modulated first radar returns reflected from a transmitted first sub-pulse and second radar returns reflected from a transmitted second sub-pulse, said first transmitted sub-pulse having linear frequency modulation centered about a first center frequency, $f_1$, and transmitted at time $t_1$, said second transmitted sub-pulse having linear frequency modulation centered about a second center frequency, $f_2$, and transmitted at time $t_2$, said second center frequency higher than said first center frequency, said first transmitted sub-pulse and said second transmitted sub-pulse having a linear frequency modulated chirp slope γ, said method comprising the step of sample shifting and phase adjusting said first radar returns reflected from said transmitted first sub-pulse with respect to said second radar returns reflected from said second sub-pulse to form a line of frequency modulated chirp slope γ with respect to time, said line connecting said first center frequency with said second center frequency.

2. The method for improving range resolution as claimed in claim 1 wherein said first sub-pulse and second sub-pulse have equal time duration, said second center frequency equidistant from a reference frequency, said returns reflected by a target located at a location near a reference point s, further comprising the steps of:

computing said reference frequency $f_{ref}$ centered with respect to said first center frequency and said second center frequency, $$f_{ref} = \frac{f_1 + f_2}{2};$$

computing a reference time $$t_{ref} = \frac{t_1 + t_2}{2};$$

computing a time delay $\tau_{s,ref}$ to said reference point s with respect to said reference time $t_{ref}$ using $$\tau_{s,ref} = \frac{\tau_{s,1} + \tau_{s,2}}{2};$$

computing a time delay $\tau_{s,m}$ to said reference point s with respect to time $t_m$ for m=1, 2;

time shifting said first sub-pulse returns received from said first sub-pulse by an amount $$\Delta \tau_m = -\frac{(f_{ref} - f_m)}{\gamma} + \tau_{s,ref} - \tau_{s,m}$$

thereby time shifting and phase adjusting said return information obtained from said first sub-pulse with information obtained from said second sub-pulse to increase the apparent receiving bandwidth of said radar.

3. A method for improving range resolution as claimed in claim 1 wherein said linear frequency modulation has a positive slope.

4. A method for improving range resolution as claimed in claim 1 wherein said first sub-pulse has linear frequency modulation extending from a minimum frequency of $f_{1,min}$ to a maximum frequency $f_{1,max}$ and said second sub-pulse has linear frequency modulation extending from a minimum frequency of $f_{2,min}$ to a maximum frequency $f_{2,max}$.

5. A method for improving range resolution as claimed in claim 4 wherein $f_{1,max}$ and $f_{2,min}$ overlap and data generated during this overlap is deleted so as not to contribute to the resulting radar image of said target.

6. A method for improving range resolution as claimed in claim 5 for a target resolution δ, number of steps $M_{step}$, main lobe broadening factor k, overlap $O_v$, and speed of light C, wherein said radar full bandwidth is $$BW = \frac{kC}{2\delta},$$

the single step bandwidth $BW_1$ is $$BW_1 = \frac{BW}{M_{step}(1 - O_v) + O_v},$$

and the center frequency $f_m$ at step m for m=1, 2 ... $M_{step}$ is computed from $$f_m = f_c - \frac{BW}{2} + BW_1[(m - 1)(1 - O_v) + 1/2].$$

7. A method for improving range resolution as claimed in claim 5 wherein said first radar returns reflected from said transmitted first sub-pulse and second radar returns reflected from said transmitted second sub-pulse, are de-chirped prior to said step of sample shifting and phase adjusting.

8. A method for improving range resolution as claimed in claim 7 wherein said first radar returns reflected from said transmitted first sub-pulse and second radar returns reflected from said transmitted second sub-pulse, are de-skewed prior to said step of sample shifting and phase adjusting.

9. A method for improving range resolution as claimed in claim 7 wherein said first radar returns reflected from said transmitted first sub-pulse and second radar returns reflected from said transmitted second sub-pulse, are de-skewed after said step of sample shifting and phase adjusting.

10. A method for improving range resolution as claimed in claim 9 wherein said first radar returns reflected from said transmitted first sub-pulse and second radar returns reflected from said transmitted second sub-pulse, each have a pulse width $T_p$ covering a swath width SW, traveling at speed of light C, the overlap frequency $O2_v$ of said first radar return and said second radar return is computed from:

$$O2_v = \frac{2 \cdot SW}{C \cdot T_p}.$$

11. A radar system having improved range resolution from linear frequency modulated first radar returns reflected from a transmitted first sub-pulse and second radar returns reflected from a transmitted second sub-pulse, said first transmitted sub-pulse having linear frequency modulation centered about a first center frequency, $f_1$, and transmitted at time $t_1$, said second transmitted sub-pulse having linear frequency modulation centered about a second center frequency, $f_2$, and transmitted at time $t_2$, said second center frequency higher than said first center frequency, said first transmitted sub-pulse and said second transmitted sub-pulse having a linear frequency modulated chirp slope γ, comprising:

means for sample shifting and phase adjusting said first radar returns reflected from said transmitted first sub-pulse with respect to said second radar returns reflected from said second sub-pulse to form a line of frequency modulated chirp slope γ with respect to time, said line connecting said first center frequency with said second center frequency.

12. The radar as claimed in claim 11 wherein said first sub-pulse and second sub-pulse have equal time duration, said second center frequency equidistant from a reference frequency, said returns reflected by a target located at a location near a reference point s, further comprising:

means for computing said reference frequency $f_{ref}$ centered with respect to said first center frequency and said second center frequency, $$f_{ref} = \frac{f_1 + f_2}{2};$$

a reference time $$t_{ref} = \frac{t_1 + t_2}{2};$$

a time delay $\tau_{s,m}$ to said reference point s with respect to time $t_m$ for m=1, 2;

a time delay $\tau_{s,ref}$ to said reference point s with respect to said reference time $t_{ref}$;

means for time shifting said first sub-pulse returns received from said first sub-pulse by an amount $$\Delta \tau_m = -\frac{(f_{ref} - f_m)}{\gamma} + \tau_{s,ref} - \tau_{s,m}$$

thereby time shifting and phase aligning said return information obtained from said first sub-pulse with information obtained from said second sub-pulse to increase the apparent receiving bandwidth of said radar.

13. A radar as claimed in claim 11 wherein said linear frequency modulation has a positive slope.

14. A radar as claimed in claim 11 wherein said first sub-pulse has linear frequency modulation extending from a minimum frequency of $f_{1,min}$ to a maximum frequency $f_{1,max}$ and said second sub-pulse has linear frequency modulation extending from a minimum frequency of $f_{2,min}$ to a maximum frequency $f_{2,max}$.

15. A radar as claimed in claim 14 wherein $f_{1,max}$ and $f_{2,min}$ overlap and data generated during this overlap is deleted so as not to contribute to the resulting radar image of said target.

16. A radar as claimed in claim 15 having a target resolution δ, number of steps $M_{step}$, main lobe broadening factor k, overlap $O_v$, and speed of light C, wherein said radar full bandwidth is $$BW = \frac{kC}{2\delta}$$

the single step bandwidth $BW_1$ is $$BW_1 = \frac{BW}{M_{step}(1 - O_v) + O_v},$$

and a center frequency $f_m$ at step m for m=1, 2 ... $M_{step}$ is computed from $$f_m = f_c - \frac{BW}{2} + BW_1[(m-1)(1 - O_v) + 1/2].$$

17. A radar as claimed in claim 15 wherein said first radar returns reflected from said transmitted first sub-pulse and second radar returns reflected from said transmitted second sub-pulse, are de-chirped prior to said sample shifting and phase adjusting.

18. A radar as claimed in claim 17 wherein said first radar returns reflected from said transmitted first sub-pulse and second radar returns reflected from said transmitted second sub-pulse, are de-skewed prior to said sample shifting and phase adjusting.

19. A radar as claimed in claim 17 wherein said first radar returns reflected from said transmitted first sub-pulse and second radar returns reflected from said transmitted second sub-pulse, are de-skewed after sample shifting and phase adjusting.

20. A radar as claimed in claim 19 wherein said first radar returns reflected from said transmitted first sub-pulse and second radar returns reflected from said transmitted second sub-pulse, each have a pulse width $T_p$ covering a swath width SW, traveling at speed of light C, the overlap frequency $O2_v$ of said first radar return and said second radar return is computed from:

$$O2_v = \frac{2 \cdot SW}{C \cdot T_p}.$$

* * * * *